Oct. 11, 1949.   J. SIMPSON   2,484,317
CAN TESTING POCKET
Filed May 11, 1945   3 Sheets-Sheet 2
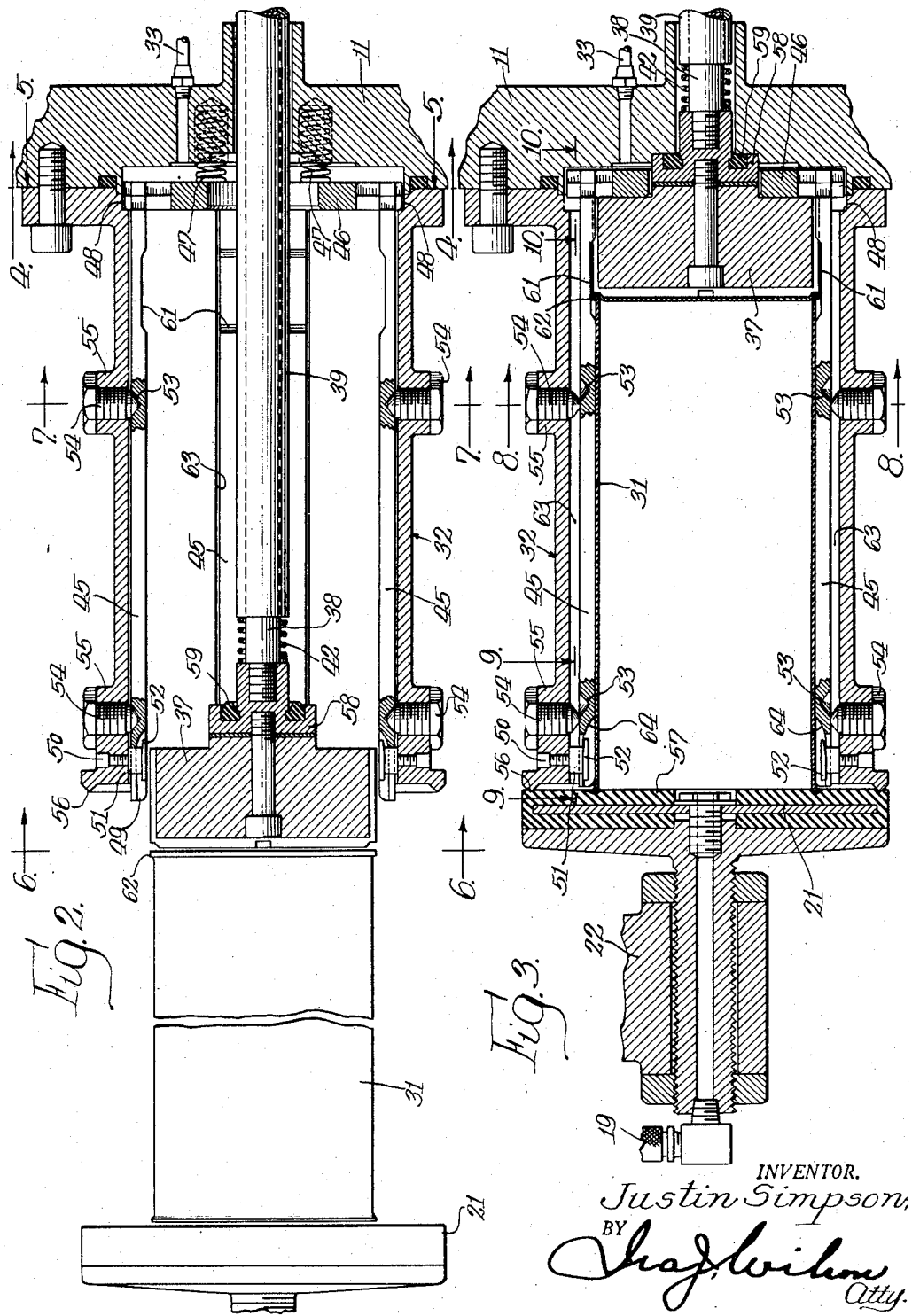

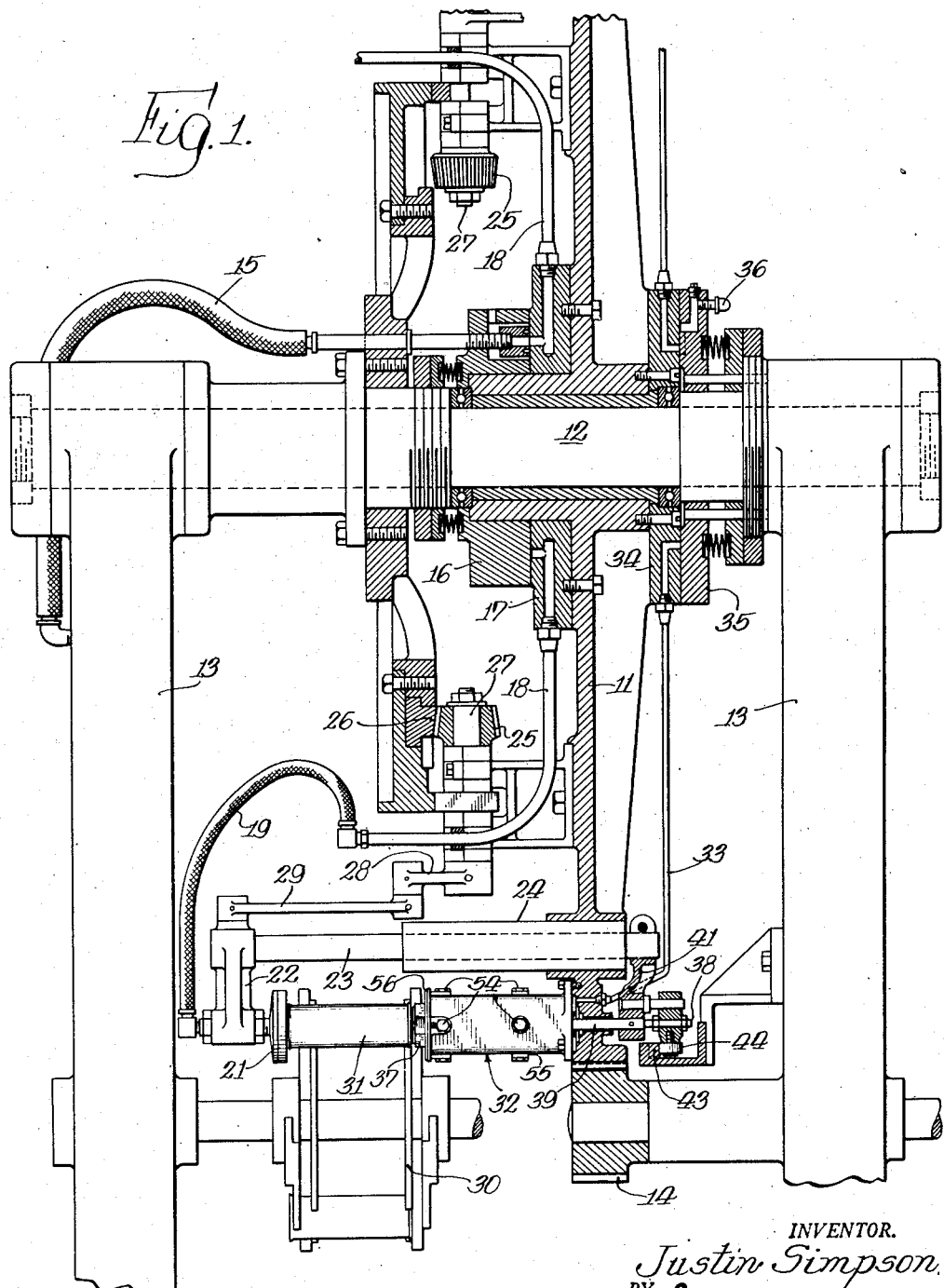

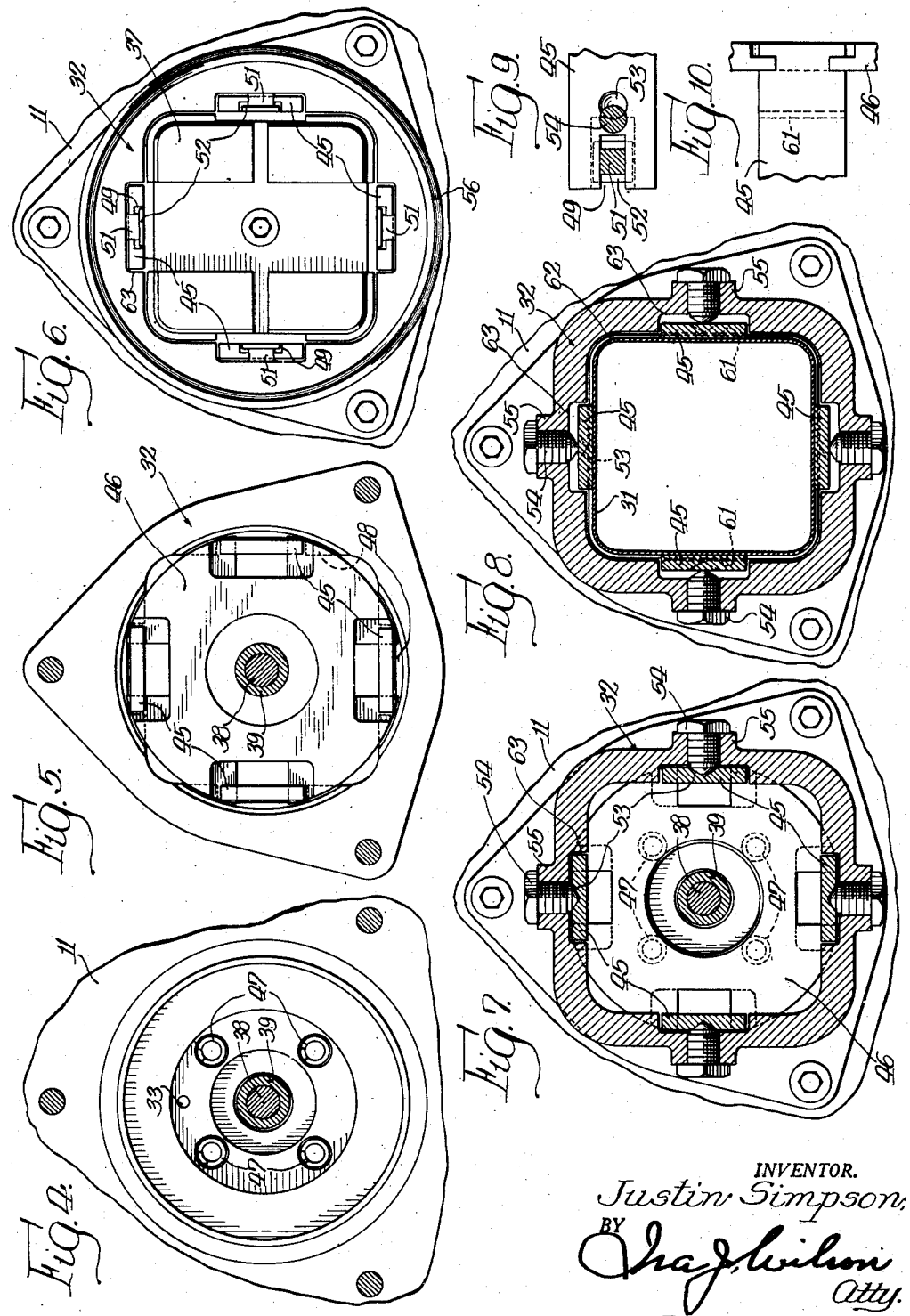

Patented Oct. 11, 1949

2,484,317

UNITED STATES PATENT OFFICE 2,484,317

CAN TESTING POCKET

Justin Simpson, Elmhurst, Ill., assignor to Cameron Can Machinery Company, Chicago, Ill., a corporation of Illinois Application May 11, 1945, Serial No. 593,225

17 Claims. (Cl. 73—40)

This invention relates to machines for testing can bodies for leaks, and has more particular reference to the structure of the pockets in which the bodies are positioned during the test.

In machines of this character it is customary to provide a pocket in which the body to be tested is sealed, to vent the pocket chamber around the body to atmosphere, then close it off and admit air under pressure to the interior of the body. Any increase in pressure in the chamber around the body resulting from leakage of the body will be detected by suitable mechanism which controls the discharge of the bodies, so that leaky bodies are discharged into one chute while the good bodies are discharged into another.

In the testing of square or irregularly shaped bodies, any outward bulging of the sides of the bodies will increase the pressure in the chamber surrounding the body, the same as if air escaped from a leaky body into such chamber. Such bulging is not uncommon and may be caused by variations in the amount of air pressure or the time of application of the air pressure to the body or the thickness and temper of the material of which the body is made. The increase in pressure in the chamber thus caused produces the same effect upon the detector as a leaky body, with the result that a good non-leaky can body is discharged into the leaky can chute. In this manner a considerable number of good non-leaky bodies become rejects with consequent production loss and increased manufacturing cost.

One of the primary purposes of my present invention is to eliminate the loss of good can bodies which are erroneously rejected as leaky cans because of the bulging of the side walls of the body during the test.

With this end in view, my invention contemplates the employment of a holding means which prevents the bulging of bodies in the testing pockets when the air pressure is applied to the interior thereof, consequently, the pressure in the surrounding chamber is not raised unless an actual leak in the body occurs.

The employment of my invention enables a highly sensitive detector to be used, capable of detecting slight leaks which will not increase the pressure in the surrounding chamber more than such pressure would be increased by a bulging side wall of the body. A very sensitive tester, therefore, can be produced which will not deliver non-leaky bodies into the leaky body chute.

For the purpose of facilitating an understanding of my invention, I have illustrated on the accompanying drawings one embodiment thereof in which Fig. 1 is a fragmentary sectional view through a testing machine equipped with my invention;

Fig. 2 is a longitudinal sectional view through a can pocket equipped with my invention, the holding bars being in expanded position to permit the introduction of a body;

Fig. 3 is a similar view showing the position of the parts with the body in the pocket in position for testing;

Figs. 4, 5, 6, and 7 are sectional views on the lines 4—4, 5—5, 6—6, and 7—7, respectively, of Fig. 2;

Fig. 8 is a transverse sectional view on the line 8—8 of Fig. 3; and

Figs. 9 and 10 are fragmental sectional views on the lines 9—9 and 10—10, respectively, of Fig. 3.

Referring to the drawings more in detail, it will be observed from Fig. 1 that the tester to which my invention is shown as applied is of the rotary type comprising a wheel 11 rotatable upon a horizontal shaft 12 which is supported in standards 13, rotation being imparted to the wheel by a driving pinion 14.

Compressed air from a suitable source is supplied through a conduit 15 for delivery to the interior of the can bodies being tested, delivery of the air to the bodies being controlled by a rotary valve comprising the stationary member 16 and the rotatable member 17 from which the conduits 18 and flexible hose 19 conduct the air to the hollow stem of a clamping pad 21 carried by a reciprocatory head 22 mounted on a guide rod 23 which is reciprocable in an elongated bearing 24. Reciprocation of each clamping pad 21 is effected by a pinion 25 carried by the wheel 11 in position to mesh with suitably located segmental stationary racks 26. Each pinion is fixed on a shaft 27 equipped at its lower end with a crank 28 which is connected by a link 29 with the head 22, so that at each half revolution of the pinion the pad 21 is moved inwardly or outwardly the full length of its stroke.

A feeding device 30 in the form of a turret or other type of conveyor brings the can bodies 31 successively into alignment with the heads 21 and correspondingly located opposed testing pockets designated generally by reference character 32. Each of these pockets is connected by a conduit 33 with the rotatable member 34 of a control valve, the stationary member 35 of which is connected by a pipe 36 with a suitable detector, not shown, adapted to be actuated to control the discharge of the can bodies from the tester, so that the leaky bodies are delivered to one chute and the good bodies to another.

The tester thus far described may be considered typical of air testers adapted to be equipped with my invention, and the structural details of such testers not herein disclosed may be obtained by reference to Cameron Patent No. 2,101,129, issued December 7, 1937, and also Cameron Patent No. 2,020,535, issued December 12, 1935.

As in the patents referred to, the testing pockets 32 are preferably cast metal receptacles mounted at one end on the wheel 11 and open at the other end. A reciprocatory plunger 37 designed to serve as a companion clamping pad to the clamping pad 21 is carried by a rod 38 which in turn is supported by a reciprocatory sleeve 39 connected by a head or bracket 41 (Fig. 1) with the reciprocatory rod 23, so that the pads 21 and 37 are reciprocated simultaneously. The rod 38 is projected from the sleeve 39 by a spring 42 toward the pad 21 to cause the clamping of a can body 31 between the heads. A cam 43 mounted on the machine frame acting upon a cam follower 44 carried on the outer end of rod 38 serves to retract the head 37 against the action of spring 42 to permit the introduction of a can body 31 between the clamping heads and to subsequently permit the discharge of the body from between the heads. The construction thus far described is conventional, and exemplifies a structure to which my invention is applicable.

The purpose of my invention being to prevent the bulging of the side walls of a can body under the influence of the air pressure introduced into the body, I have accordingly provided a plurality, in the present instance four, holding members or bars 45 adapted to be disposed in each testing pocket in the space between the walls of the pocket and the walls of the can body, which space constitutes the test chamber surrounding the body, the variation in pressure of which is utilized in testing for leaks. Each bar 45 is shaped at its inner end, as will be apparent from Figs. 5 and 10, for slidable connection to a spider 46 loosely disposed in the bottom of the pocket so as to be capable of limited movement longitudinally of the pocket under the influence of springs 47 which normally urge the spider against the shoulder 48 formed in the side walls of the pocket near the inner end thereof. Since, as will be apparent from Fig. 10, the holding bars 45 are connected to the spider to move therewith, these bars are projected longitudinally toward the mouth of the pocket, by the springs 47 acting on the spider, into the position shown in Fig. 2 for the insertion and removal of a can body, and are retracted into the pocket into the position shown in Fig. 3 when the spider is forced inwardly against the action of springs 47 by the clamping head 37.

The outer ends of the clamping bars 45 are longitudinally slotted, as indicated at 49, Fig. 9, to straddle the shanks 51 of supporting blocks equipped with supporting flanges 52 by which the bifurcated outer ends of the bars are supported. The blocks are preferably attached to the walls of the pockets by screws 50.

Between its ends each bar 45 is provided with a plurality of conical sockets or depressions 53 adapted to receive the tapered inwardly projecting ends of screws or bolts 54 threaded through thickened portions of the pocket walls, forming in effect studs 55 for the reception of the bolts. When the bars are in their outer position, as shown in Fig. 2, the ends of these screws are seated in the sockets 53, and when the bars are moved inwardly into the position shown in Fig. 3, the screws serve by a cam action to force the bars inwardly into clamping relation with the side walls of the can body, as shown in Figs. 3 and 8.

It will be observed that the open end of the pocket is equipped with an annular rib 56 adapted to be slightly embedded in and to form a hermetic seal with the rubber or other yieldable and resilient covering 57 for the face of the clamping pad 21. The rod 38 is provided with a head 58 which carries a sealing ring 59 adapted to hermetically seal the opening through which the rod 38 projects when the various parts are positioned for testing, as illustrated in Fig. 3. It will also be apparent that the bars 45 are recessed on their inner faces, as indicated at 61 (Fig. 3), to accommodate the peripheral bead 62 resulting from double seaming the end onto the body of the can, thereby permitting the faces of the bars 45 to snugly engage the outer faces of the can body. From Figs. 6, 7 and 8 it will be apparent that the walls of the test pocket are recessed longitudinally, as indicated at 63, to accommodate the bars 45, thereby permitting the pockets to be of smaller size than they would be if the bars were disposed between the bodies and the normal inner faces of the pockets, and consequently reducing the size of the test chamber surrounding the can body so as to increase the sensitivity of the apparatus. It will also be apparent from Figs. 2 and 3 particularly that the inner faces of the bars 45 are tapered or curved at 64 to cooperate with the holding flanges 52 of the supporting blocks 51 in camming or forcing the bars away from the can body when the bars are moved outwardly or to the left viewing Figs. 2 and 3.

Assuming that the parts are in the position shown in Figs. 1 and 2 of the drawings, a can body is brought into alignment and clamped between the clamping heads 21 and 37, whereupon, as the testing wheel continues to rotate, the clamped body is introduced into a pocket. During the introduction of the body the clamping bars are in expanded position, as shown in Fig. 2, the forward end of each bar being maintained in expanded position by cooperative engagement of the flange 52 of the holding block with the cam surface 64 and the bead 62 at the bottom of the can body prevents contact of the bars with the body, such as might mar or scratch the body, if it be of the decorated type. As the clamping head 37 approaches the bottom of the pocket, it carries with it the spider 46 against the force of the springs 47, and the spider draws the clamping bars with it toward the right from the position shown in Fig. 2 to that shown in Fig. 3, thus bringing the bars into clamping engagement with the side walls of the can body. As the clamping heads reach the end of their stroke, the inner end of the chamber surrounding the body is sealed by the sealing ring 59 while the outer end is sealed by engagement of the head 21 with the annular rib 56. Through the valve 34, 35 the chamber surrounding the can body is now vented to atmosphere and then closed off, whereupon, through valves 16 and 17 air under pressure is admitted through clamping head 21 into the interior of the body. Since expansion or outward bulging of the body walls under the influence of this pressure is precluded by the clamping bars 45, the volume of the test chamber surrounding the body will not be changed by the admission of air into the body and the pressure therein will accordingly remain constant, unless it be increased by air leaking into it from a defective body.

It should be apparent from the foregoing that I have provided apparatus whereby square or other shaped can bodies may be accurately tested for small leaks without liability of the rejection of a good can body by reason of the bulging of the can walls under pressure. It will also be manifest that no scratching or marring of the can body exterior will result from its introduction into or removal from a testing pocket equipped with my invention, because during the initial introduction of the can body into the pocket and during its final withdrawal the front ends of the clamping bars are cammed into expanded position and the rear portions are held away from the body by the double seamed bead in the bottom of the body. Furthermore, when the bars are moved into engagement with the body as the body reaches its extreme inner position in the pocket, the bars are drawn inwardly longitudinally by the spider as the inner clamping head approaches the bottom of the pocket, consequently, as the bars approach and engage the body they are traveling longitudinally with instead of relatively to the body. In this manner scratching or marring which might result from relative movement between the bars and body is avoided.

The structural details illustrated and described may obviously be varied within considerable limits without departing from the scope of my invention as defined in the following claims.

I claim:

1. The combination with a testing pocket adapted to receive a can body and having a relatively movable closure to provide a sealed chamber surrounding the body, of a plurality of holding bars disposed in said pocket, means for moving said closure and pocket relatively to seal the pocket and means for moving said bars into contact with the walls of said body when the pocket is sealed to thereby prevent bulging of said walls under testing pressure.

2. The combination with a testing pocket of a pneumatic can body testing machine, of a plurality of holding bars disposed in said pocket, means for moving said bars longitudinally with the can body during the final introduction movement into and initial delivery movement from a pocket of a can body, and means for moving said bars into clamping engagement with the body during such final introduction.

3. In a can testing machine, the combination with a testing pocket, of means for introducing a can body therein, a plurality of clamping bars disposed in said pocket, and means operable upon the introduction of a body into said pocket for moving said bars into clamping engagement with said body.

4. In a pneumatic can testing machine, the combination of a testing pocket, means movable in said pocket between operative and inoperative positions to prevent the bulging of a can body subjected to test pressure in said pocket and normally in inoperative position when no can body is in the pocket, and mechanism automatically operable upon the movement of a can body into said pocket for moving said bulge preventing means into operative relation to the body in said pocket.

5. In a can testing machine including a test pocket and means for introducing a can body to be tested therein, the combination of a plurality of clamping bars in said pocket, said bars being movable longitudinally and radially of said pocket, means operative in timed relation to said introducing means for moving said bars longitudinally as the can body to be tested approaches its final position in the pocket, and cam means for moving said bars radially inwardly of the pocket during said longitudinal movement thereof.

6. A can testing machine, comprising a test pocket, a spider therein movable longitudinally of the pocket, means for moving said spider, a plurality of clamping bars connected with the spider to move therewith, said bars and said pocket walls having cooperative opposed cam surfaces effective to move said bars radially inwardly upon longitudinal movement thereof in one direction by the spider, and means effective to move said bars radially outwardly upon longitudinal movement thereof in the opposite direction.

7. In a can testing machine including a test pocket, the combination with said pocket of a spider therein movable longitudinally of the pocket, a plurality of clamping bars connected with said spider to move therewith, said bars being provided with inclined surfaces, means carried by the walls of said pocket for cooperating with said inclined surfaces of the bars to move the bars radially inwardly into clamping relation with the walls of a can body to be tested upon longitudinal movement of said bars in one direction, and means for supporting the outer ends of said bars, said supporting means and bars having cooperating surfaces whereby said bars are moved radially outwardly when the bars are moved longitudinally in the opposite direction.

8. In a can testing machine, the combination with a testing pocket, of can body clamping bars located therein, a spider to which the inner ends of said bars are connected, supports for the outer ends of said bars, springs arranged to project said spider away from the bottom of said pocket, means for limiting the extent of such projection of the spider, means for moving said spider against the action of said springs upon the introduction movement of said can body into said pocket, and means actuated by the last named movement of said spider for moving said bars into clamping relation with the walls of the body introduced into said pocket.

9. In a can body testing device, the combination with means providing a test pocket for can bodies, said pocket having an open end, of means for introducing a can body into said pocket and including a pocket end closure head movable toward and from pocket closing position, a spider disposed in said pocket and movable in one direction longitudinally of the axis thereof in response to movement of said closure head toward pocket closing position, a plurality of can body clamping bars connected with said spider for movements therewith longitudinally of said pocket axis, said bars being also movable radially of said axis toward and from a can body positioned within said pocket, cooperative camming means in said pocket and on said bars for moving said bars radially of said axis toward can body clamping position upon movement of said bars in one direction longitudinally of said axis and for moving said bars radially of said axis from can body clamping position upon movement of said bars in the opposite direction longitudinally of said axis, and means operative upon movement of said head from pocket closing position for moving said bars longitudinally of said axis in the other direction.

10. In a can testing machine of the character described, a can testing pocket including a removable closure adapted to receive and to provide a sealed chamber about a can body, a plurality of clamps disposed within said pocket and movable into and out of engagement with the side wall surface of a can body disposed within said pocket, said clamps being arranged to engage said can body wall surface at a plurality of places transversely and longitudinally of the body relative to the axis of the body, and means actuated by closing movement of said closure for moving said clamps into and out of body clamping position.

11. In a can testing machine of the character described, a testing pocket including a removable closure adapted to receive and to provide a sealed chamber about a can body having predetermined longitudinal and transverse dimensions, a plurality of clamping members disposed within said pocket and arranged for movements between positions where they are substantially in contact with predetermined portions of the external surface area of the can body side walls both transversely and longitudinally of such walls relative to the axis of the body and positions relatively remote from said side walls, and means actuated upon opening and closing movements of said closure for moving said members from either position to the other.

12. In a pneumatic can testing machine having a testing pocket for the reception of a can body, means for sealing said pocket with a can body disposed therein and means for creating a pressure differential between the pressure within the can body and the pressure within the pocket external to said body, means for limiting the outward deflection of the side wall of the can body, comprising a plurality of elements disposed within said pocket and engageable with predetermined places over the external surface of the can body side wall.

13. In a can testing machine of the character described, means providing a can testing pocket and a removable closure therefor adapted to receive and to provide a sealed chamber about a can body, a plurality of clamps disposed within said pocket and movable into and out of engagement with the outer side wall surface of a can body disposed within said pocket, said clamps having portions arranged to engage said can body wall surface at a plurality of places transversely and longitudinally of the body relative to the axis of the body, means for injecting a can body into and for ejecting the can body from the pocket, and means operated by said injecting and ejecting means for moving said clamps respectively into and out of body clamping position.

14. In a can testing machine of the character described, means providing a testing pocket and a removable closure therefor adapted to receive and to provide a sealed chamber about a can body having predetermined longitudinal and transverse dimensions, a plurality of clamping members within said pocket for movements between positions where they are substantially in contact with predetermined portions of the external surface area of the can side walls both transversely and longitudinally relative to the axis of the body and positions relatively remote from said side walls, means for injecting a can body into and for ejecting the can body from the pocket, and means operated by said injecting and ejecting means for moving said members from one position to the other and vice versa.

15. In a pneumatic can testing machine having a testing pocket for the reception of a can body, means for sealing said pocket and means for creating a pressure differential between the pressure within the can body and the pressure within the pocket external of the can body so that the pressure within the body is greater than that external thereto, a plurality of elements mounted within said pocket in spaced relation to one another for movements toward and from the longitudinal axis of a can body within said pocket, said elements having portions constructed and arranged substantially to contact the external surface of the can body side wall at a plurality of places about and longitudinally of the axis of the can body to restrict outward deflection thereof under the influence of said differential pressure, means for moving a can body into and out of said pocket and means operative upon movement of a can body to a predetermined position within said pocket for moving said elements toward contact with said side wall of a can body in said pocket.

16. In a pneumatic can testing machine, a testing pocket for the reception of a can body, means for sealing said pocket with a can body disposed therein, means for creating a pressure differential between the pressure within and that without the can body, while the said body is sealed within said pocket, so that the pressure external to the body is normally less than that within the body, means comprising a series of elements disposed within said pocket and movable toward and substantially into contact with the exterior surface of the can body side wall for limiting outward movement of the said side wall under the influence of said differential pressure, means for moving said elements toward said can body side wall prior to creation of said differential pressure, means for moving said elements away from said side wall upon completion of a test, and means for operating said pressure differential creating means and both of said moving means in predetermined timed relation to one another.

17. In a pneumatic can testing machine, a testing pocket for the reception of a can body, means for sealing said pocket with a can body disposed therein, means for creating a pressure differential between the pressure within and that without the can body, while the said body is sealed within said pocket, so that the pressure external to the body is normally less than that within the body, means comprising a series of elements disposed within said pocket and movable toward and substantially into contact with the exterior surface of the can body side wall for limiting outward movement of the said side wall under the influence of said differential pressure, means for moving said elements substantially simultaneously toward said can body side wall prior to creation of said differential pressure, means for ejecting a can body from the pocket upon completion of a test, means operated by said ejecting means for moving said elements away from said side wall upon completion of a test, and means for operating said pressure differential creating means, said ejecting means and both of said moving means in predetermined timed relation to one another.

JUSTIN SIMPSON.

REFERENCES CITED

The following references are of record in the file of this patent:

UNITED STATES PATENTS

| Number | Name | Date |
|---|---|---|
| 475,446 | Emery | May 24, 1892 |
| 521,935 | Mann | June 26, 1894 |